United States Patent [19]

Ethridge et al.

[11] Patent Number: 4,647,077
[45] Date of Patent: Mar. 3, 1987

[54] HIGH PRESSURE PRODUCT SWIVEL

[75] Inventors: Charles O. Ethridge, Spring; Kristen I. Pedersen, Houston, both of Tex.

[73] Assignee: Sofec, Inc., Houston, Tex.

[21] Appl. No.: 683,669

[22] Filed: Dec. 17, 1984

[51] Int. Cl.[4] .............................................. F16L 39/00
[52] U.S. Cl. ................................... 285/98; 285/136; 285/168; 285/190; 285/276; 285/281
[58] Field of Search ................... 285/95, 98, 108, 131, 285/134, 136, 168, 190, 273, 276, 277, 281; 277/3, 27, 59, 205; 415/53 T

[56] References Cited

U.S. PATENT DOCUMENTS

| 1,585,864 | 5/1926 | Joyce | 277/59 |
|---|---|---|---|
| 2,293,585 | 8/1942 | Bard . | |
| 3,011,803 | 12/1961 | Buckner et al. | 285/276 |
| 3,074,082 | 1/1963 | Griebee . | |
| 3,237,220 | 3/1966 | Bengt-Ake Brandt . | |
| 3,366,982 | 2/1968 | Sutton . | |
| 3,462,176 | 8/1969 | Goodrum . | |
| 3,466,061 | 9/1969 | Fonda-Bonardi . | |
| 3,468,564 | 9/1969 | Frohlich | 285/276 |
| 3,698,433 | 10/1972 | Dobler et al. . | |
| 3,836,291 | 9/1974 | Bottcher et al. | 415/53 T |
| 3,966,249 | 6/1976 | Linqvst . | |
| 4,065,159 | 12/1977 | Leroy et al. . | |
| 4,103,909 | 8/1978 | Hoffman et al. | 277/205 |
| 4,111,467 | 9/1978 | de Fremery . | |
| 4,126,336 | 11/1978 | Ortloff et al. . | |
| 4,142,767 | 3/1979 | Karl et al. . | |
| 4,254,523 | 3/1981 | Kentosh . | |
| 4,289,336 | 9/1981 | Bajeux | 285/136 |
| 4,306,741 | 12/1981 | Foolen . | |
| 4,405,162 | 9/1983 | Williams | 285/136 |
| 4,441,522 | 4/1984 | Griffin | 285/136 |
| 4,443,016 | 4/1984 | Schüngel | 277/27 |
| 4,477,091 | 10/1984 | Adamek | 277/205 |

FOREIGN PATENT DOCUMENTS

| 33856 | 12/1968 | Japan | 415/53 T |
|---|---|---|---|
| 54719 | 4/1980 | Japan | 277/3 |

Primary Examiner—Cornelius J. Husar
Assistant Examiner—Anthony Knight
Attorney, Agent, or Firm—Dodge, Bush & Moseley

[57] ABSTRACT

A rotatable swivel comprising a swivel body, a ball bearing assembly, and a primary upper seal axially offset from a primary lower seal for sealing a conduit chamber is disclosed. Pressurization of the conduit chamber of the swivel in cooperation with the differential axial offset of the primary seals creates axial preloading of the swivel operably aiding in the sealing of the conduit chamber and maintaining the concentricity of the bearing assembly between a rotatable outer ring and a stationary inner ring and providing wear compensation for the swivel. Secondary upper and lower seals are disclosed whereby if the primary seals fail to retain pressure in the conduit chamber, the respective secondary seal maintains the initial axial loading of the failed primary seal.

13 Claims, 5 Drawing Figures

HIGH PRESSURE PRODUCT SWIVEL

BACKGROUND OF THE INVENTION

1. Field of the Invention

This invention relates in general to equipment for transferring fluids. In particular, the invention relates to a product swivel and a swivel assembly adapted for transferring fluids between tankers, storage vessels and the like and one or more conduits beneath the ocean surface.

2. Description of the Prior Art

The offshore search for oil and gas has greatly expanded in recent years and progressed into deep rough waters such as the North Sea. To facilitate production of oil and gas from remotely located offshore fields, complex mooring systems for floating vessels which serve as centralized production sites for the entire field have been developed. Flexible fluid lines extend from a subsea location to the mooring site to permit the transfer of fluids between a moored vessel and a subsea location. For example, certain fluid lines may be used to convey oil and gas into the floating vessel while other fluid lines may be used to inject liquids or gases back into the field for purpose of field stimulation or storage.

Floating vessels can be moored to a single point mooring system, which permits the vessel to weather vane and rotate 360 degrees about a single mooring point. To permit the vessel to rotate and move freely without causing twisting or entanglement of the various fluid lines to which the vessel is attached, it is necessary to provide a swivel mechanism to connect the fluid lines to the mooring site. Furthermore, since a plurality of fluid lines are involved, it is necessary that such a swivel have the capability of accommodating multiple lines.

Multiple line swivels for offshore use are known in the prior art. For example, U.S. Pat. No. 4,306,741 issued to Foolen describes a swivel assembly where a plurality of swivels are mounted coaxially and have an axial radial bearing structure with axial rollers and radial rollers bearingly supporting the inner and outer rings of each swivel as well as supporting one swivel with respect to each other on top of another. The seals of the Foolen patent are radial seals which seal against the outer wall of the inner ring. The seals are disposed in radial grooves in the inner wall of the outer ring making it practically impossible to assemble the swivel unit with seals of adequate rigidity to withstand the required pressure without being extruded into the seal gap between the inner and outer swivel rings. Seal material of adequate rigidity cannot be stretched enough for the seal ring and be inserted in a radial groove in the inner ring or compressed enough for insertion into radial grooves in the outer ring.

The radial seals of the prior art do not operate efficiently under high pressure because high pressure product in the conduit between the outer ring and the inner ring tends to separate rings. In other words, the inner ring deflects inwardly and the outer ring deflects outwardly, thereby forcing the radial seals out of sealing engagement of one ring from the other ring. The radial seals of the Foolen patent, as referenced above are in axial alignment above and below the conduit chamber thereby resulting in balanced axial loading between the inner and outer rings.

The prior art bearing assemblies, though designed to transfer large radial and thrust loads, lose their concentricity as the inner and outer rings deflect away from each other upon pressurization of the conduit chamber, as discussed above, thereby creating looseness in the bearing assembly. Also, as the bearing assembly wears, additional looseness results in the bearing assembly.

Such problems are compounded when the swivels are exposed to extremely high pressures.

IDENTIFICATION OF OBJECTS OF THE INVENTION

It is an object of this invention to provide a high pressure product swivel which effectively functions to rotatably connect an inlet with an outlet during conduction of high pressure product fluid through a conduit chamber.

It is another object of the invention to provide a high pressure product swivel in which the pressurization of a conduit chamber in cooperation with radial offsetting of seals creates an axial loading which will tend to force the sealing surfaces together rather than causing separation of the seal surfaces, as is common in swivel existing designs.

It is another object of the invention to provide a high pressure product swivel in which pressurization of the conduit chamber in cooperation with offsetting of primary seals creates axial loading of the swivel to provide a uni-directional loading on a plurality of bearing balls to assure that the bearing balls will support and guide the rotating swivel rings firmly without separating movements of the seal surfaces even when the bearing balls and races have sustained substantial wear after prolonged service.

It is another object of the invention to provide a high pressure product swivel having a four point contact ball bearing assembly for transferring uni-directional loading between inner and outer rings of a swivel and between upper and lower stacked swivels.

It is another object of the invention to provide a high pressure product swivel with secondary seals to retain the pressure in the conduit chamber upon failure of primary seals for maintaining the sealing and the axial loading of the inner ring and the outer ring of the swivel.

SUMMARY OF THE INVENTION

The objects identified above as well as other advantages and features of the invention are incorporated in a rotatable product swivel comprising a swivel body, a ball bearing assembly, and a primary upper seal offset a greater distance from the vertical rotation axis of the swivel than a primary lower seal. Pressurization of the conduit chamber of the swivel in cooperation with the differential offset of the upper and lower primary seals creates axial preloading on the support bearing of the swivel. The pressurization of the conduit chamber urges the rotatable outer ring downwardly with respect to the stationary inner ring and decreases the vertical distance between the outer and inner rings operably aiding in the sealing of the conduit chamber of the swivel.

Secondary upper and lower seals are for retaining pressure in the conduit chamber upon failure of a respective primary seal. The secondary seals are positioned so as to maintain the thrust or axial preloading of the primary seals even if one of the primary seals were to fail.

The swivel, according to the invention, includes a ball bearing assembly where pressurization of the conduit chamber in cooperation with the offset of the primary seals creates axial pre-loading on the bearing assembly. The axial pre-loading provides uni-directional loading on the plurality of bearing balls within the bearing assembly to prevent separation of seal surfaces due to loose bearing fits and further to provide automatic wear compensation for the bearing assembly.

According to the invention, the bearing assembly comprises a four point contact ball bearing assembly positioned between a stationary inner ring and a rotatable outer ring. The bearing assembly comprises either two or three annular bearing race elements forming a toroidally shaped bearing chamber or race having four annular inwardly facing contacts.

The swivel provides a uni-directional thrust or axial loading on the bearing assembly capable of tolerating radial deflections which occur upon pressurization of the conduit chamber.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which.

DESCRIPTION OF THE INVENTION

Figure 1:
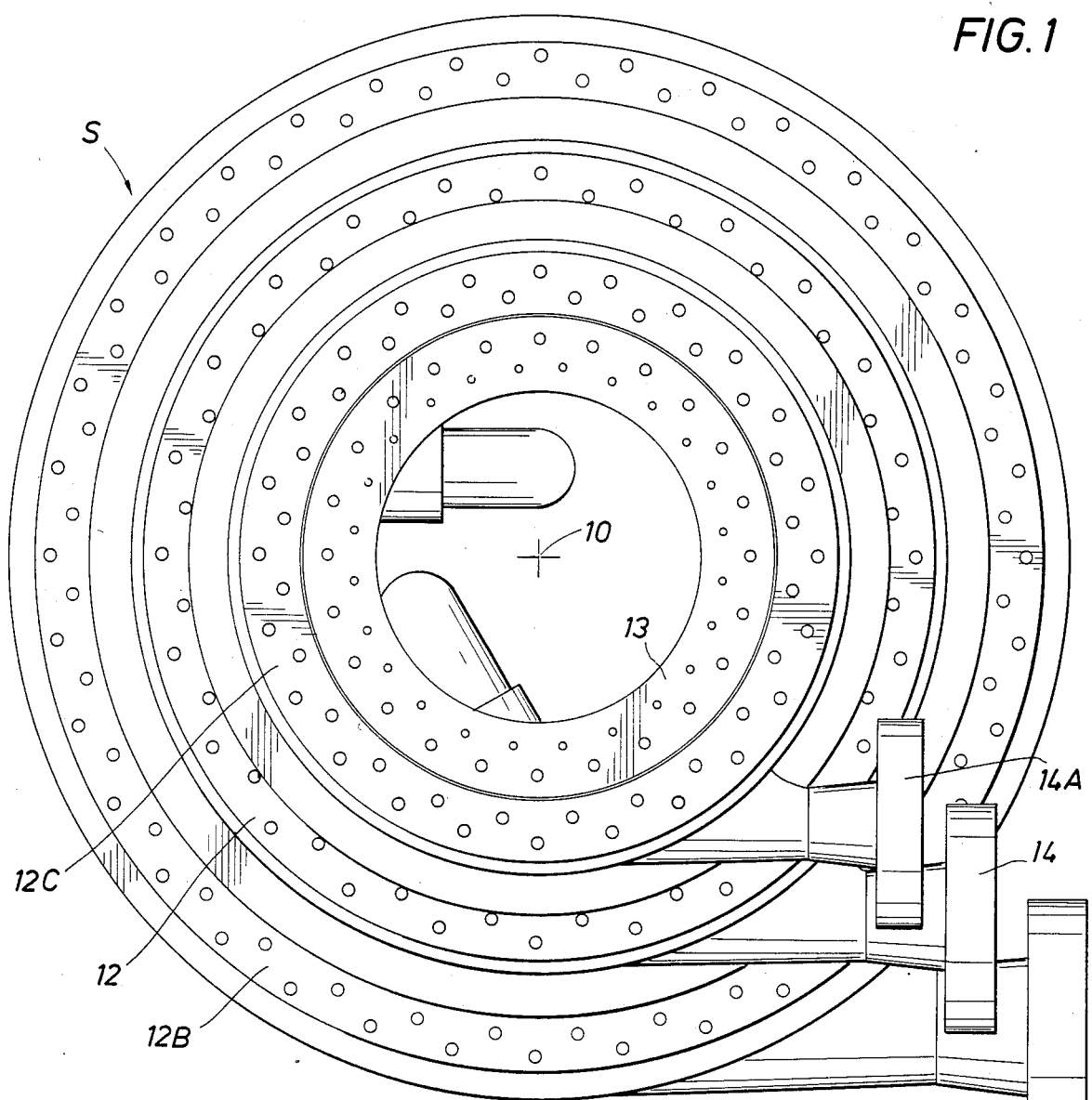
FIG. 1 illustrates in a plan view a swivel assembly in which three swivels are stacked coaxially together for connecting three conduits from beneath and interior to the swivel assembly to three conduits exterior to the assembly.
Figure 5:
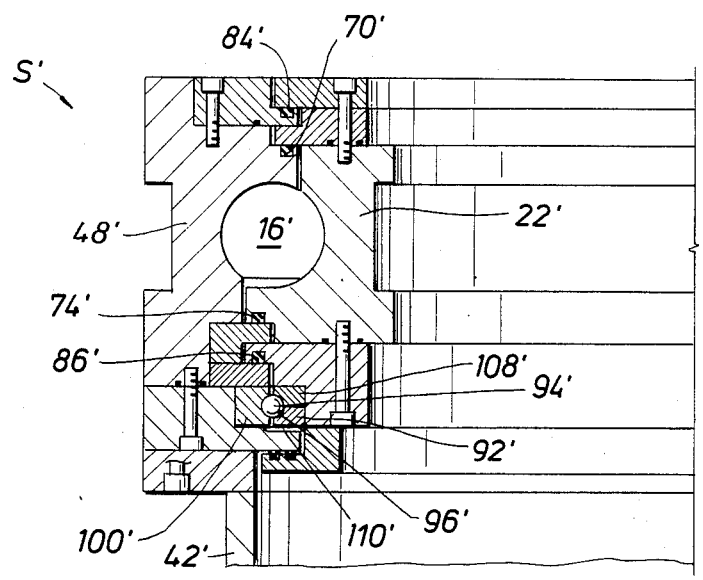
FIG. 5 illustrates an alternative embodiment of the invention where the outer rings are stationary and the inner rings are individually rotatable with respect thereto.
Figure 2:
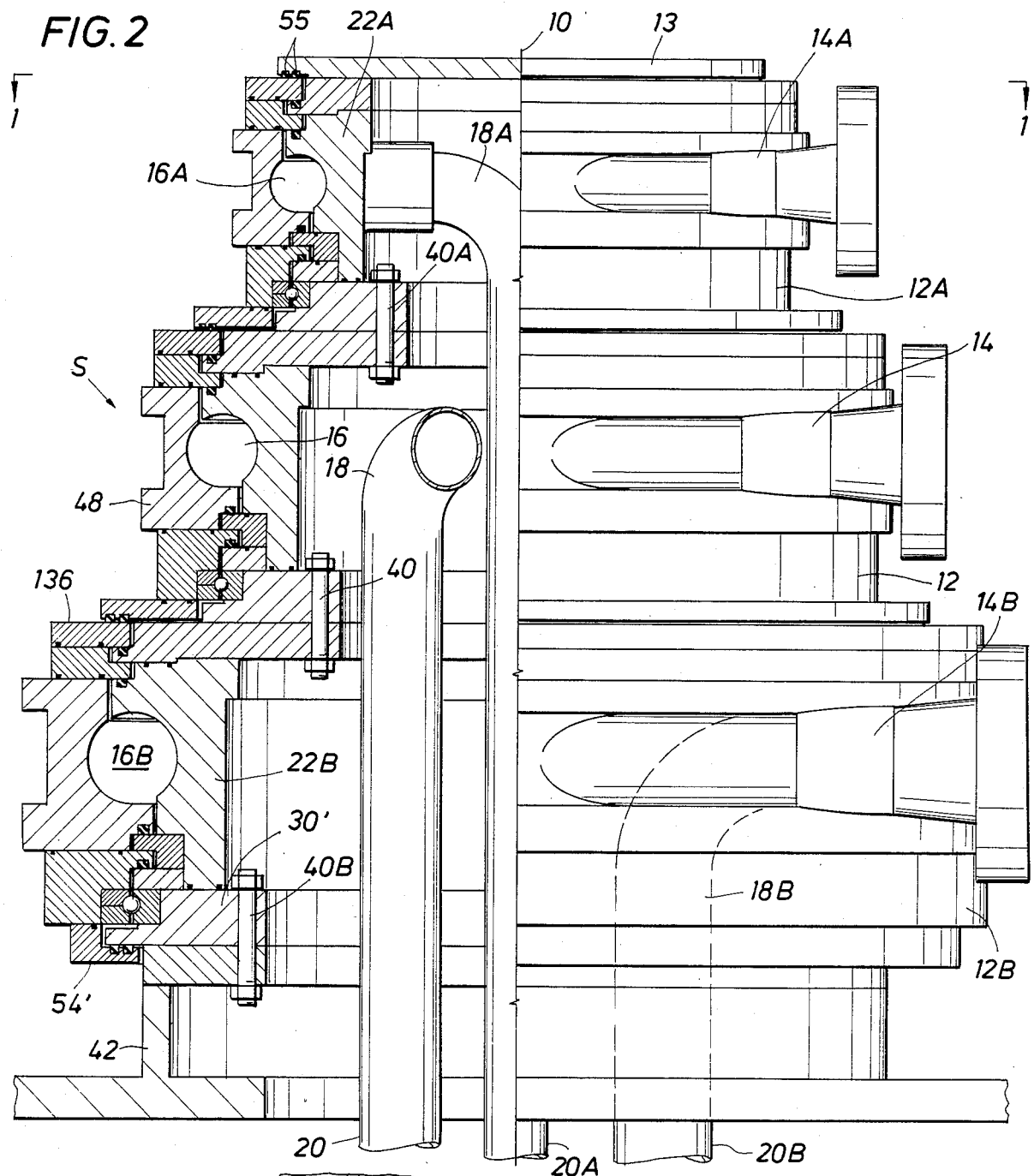
FIG. 2 shows a side view of the swivel assembly of FIG. 1 partially in cross-section.

A swivel assembly S embodying the present invention is shown in detail in FIGS. 1–4. An alternative embodiment, swivel assembly S', is shown in FIG. 5. The swivel assembly S is adapted for rotating about a vertical axis 10 as shown in FIGS. 1 and 2. The swivel assembly S comprises two or more coaxially stacked swivels which are essentially identical to one another in structure but are of different sizes.

FIG. 1 shows in a plan view of coaxially stacked swivels 12, 12A and 12B and respective external connectors 14, 14A and 14B which may be connected to external conduits for connecting to conduit chambers 16, 16A and 16B, respectively, of the stacked swivels, as shown in FIG. 2.

As shown in FIG. 2, internal conduit connectors 18, 18A and 18B connected to vertically disposed conduits 20, 20A and 20B, respectively, and conduit chambers 16, 16A and 16B, respectively. Although three swivels are illustrated in the preferred embodiment of the assembly, more or less swivels may of course be stacked in alternative embodiments.

U.S. patent application Ser. No. 635,922 filed July 30, 1984 to Pedersen, which is assigned to the same assignee of the present application, discloses a high pressure product swivel and is hereby fully incorporated herein as written description by this specific reference for any and all purposes as completely as if such patent application were set forth verbatim herein.

Figure 3:
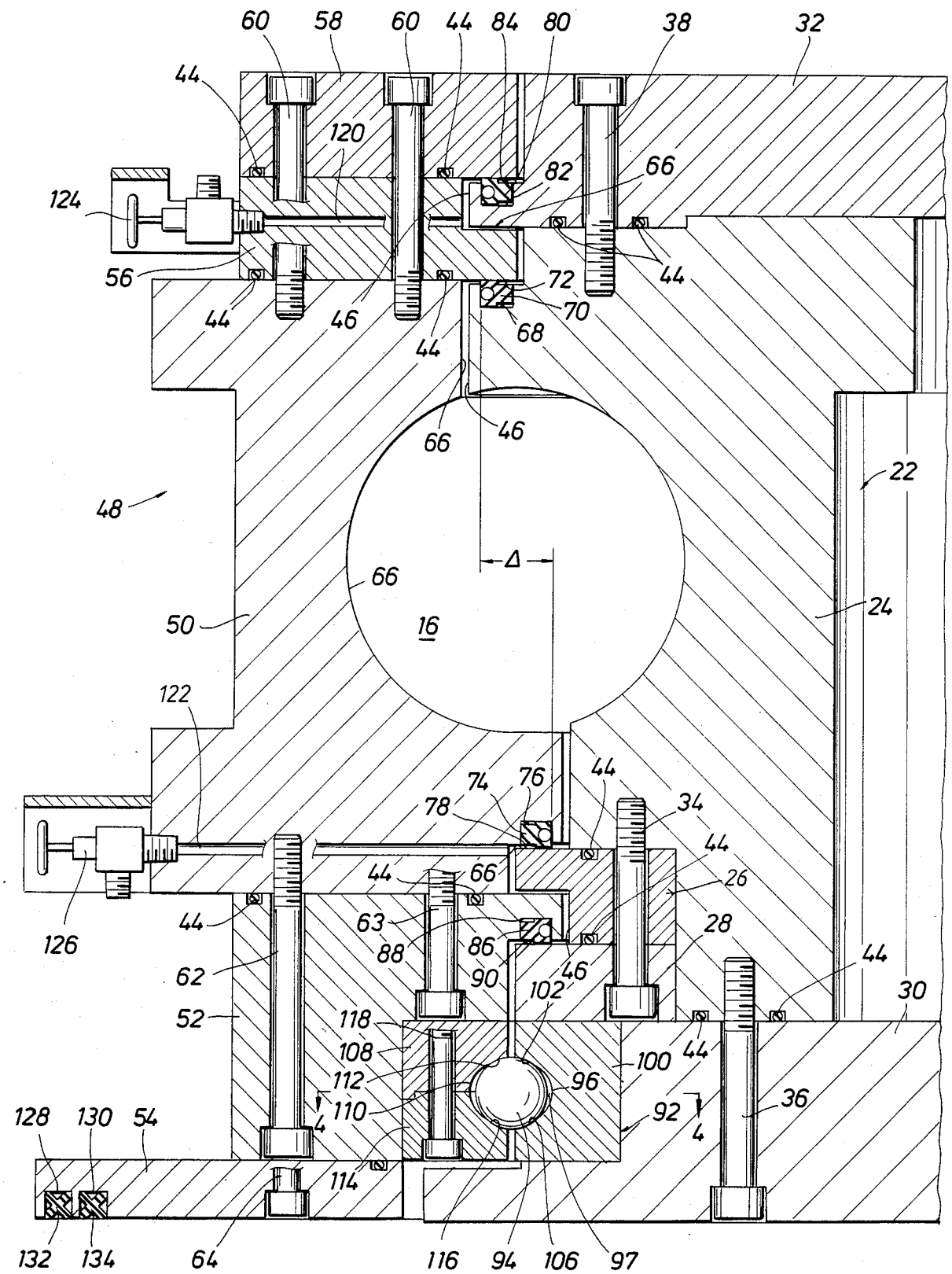
FIG. 3 illustrates a cross-section through swivel of the invention and further illustrates the preferred embodiment of the invention where the inner rings are stationary and the outer rings are independently rotatable.

As shown in FIG. 3, an inner ring 22 includes an annular primary inner ring 24, a first annular lower sealing portion 26, a second annular lower sealing portion 28, a bottom flange portion 30 and a first upper sealing portion 32. The first lower sealing portion 26 and the second lower sealing portion 28 are secured below the primary inner ring 24 by one or more bolts 34 threadedly received into threaded bores in the primary inner ring 24. The bottom flange portion 30 overlapping portion 28, is secured below the primary inner ring 24 by means of one or more bolts 36 threadedly received into a threaded bore in the primary inner ring 24. The first upper sealing portion 32 is secured above the primary inner ring 24 by means of one or more bolts 38 threadedly received into a threaded bore of the primary inner ring 24.

As shown in FIGS. 2 and 3, the first upper sealing portion 32B of the inner ring 22B is secured to the bottom flange portion 30 of inner ring 22 by one or more bolts 40. As shown in FIG. 2, inner ring 22A is bolted to inner ring 22 by bolts 40A similar to the connection as described between inner ring 22 and inner ring 22B. Inner ring 22B is bolted to stationary base 42, as shown in FIG. 2, by bolts 40B securing the inner rings 22, 22A and 22B together in a stationary fashion.

Turning once again to FIG. 3, static high pressure O-rings 44 are provided in annular grooves of the inner ring 22 in order to provide sealing between surfaces opposing the inner ring 22. In the same fashion, static high pressure O-rings are provided in an inner ring 22A and inner ring 22B.

The inner ring 22 has a substantially outwardly facing surface 46 comprising the surfaces of the primary inner ring 24, the first upper sealing portion 32, the first lower sealing portion 26 and the second lower sealing portion 28.

The swivel body further includes an outer ring 48 comprising an annular primary outer ring 50, an annular lower sealing portion 52, an annular bottom flange portion 54, an annular first upper sealing portion 56 and an annular second upper sealing portion 58. In the preferred embodiment, the first upper sealing portion 56 and the second upper sealing portion 58 are secured above the primary outer ring 50 by means of one or more bolts 60 threadedly received into one or more threaded bores of the primary outer ring 50. The lower sealing portion 52 is secured below the primary outer ring 50 by means of one or more bolts 62 threadedly received into a threaded bore of primary outer ring 50. The bottom flange portion 54 is secured below the lower sealing portion 52 by means of one or more bolts 64 threadedly received into a threaded bore in the portion 52.

Static high pressure O-rings 44 are disposed in annular grooves in the outer ring 48 for providing sealing between opposing surfaces in the outer ring 48 similarly to the sealing of the O-rings 44 in the inner ring 22.

The outer ring 48 has a substantially inwardly facing surface 66 comprising the surfaces of the primary outer ring 50, the first upper sealing portion 56, the second upper sealing portion 58 and the lower sealing portion 52.

When the outer ring 48 is assemblied concentrically about the inner ring 22, the inwardly facing concave conduit surface 66 of the primary outer ring 50 comes into registration with the outwardly facing concave conduit surface 46 of the primary inner ring 24 defining a toroidally shaped conduit chamber 16 and forms a gap above and below the conduit chamber 16. The gap is defined by the substantially outwardly facing surface 46 of the inner ring 22 and the substantially inwardly facing surface 66 of the outer ring 48.

Disposed above the conduit chamber 16 in a first annular groove 68 of the primary inner ring 24, a primary upper face seal 70 is disposed for sealingly engaging a downwardly facing sealing surface 72 of the first upper sealing portion 56 of the outer ring 48.

A primary lower face seal 74 is disposed below the conduit chamber 16 in a second annular groove 76 in the primary outer ring 50 for sealingly engaging an upwardly facing sealing surface 78 of the first lower sealing portion 26 of the inner ring 22. The primary upper seal 70 is offset a greater radial distance Δ from the vertical axis 10, as shown in FIG. 2, than the primary lower seal 74. Pressurization of the conduit chamber 16 in cooperation with the offset of the primary seals 70 and 74 creates axial loading of the swivel S to urge the rotatable outer ring 48 downwardly with respect to the stationary inner ring 22. Such downward urging of the outer ring 48 tends to decrease the vertical distance between the sealing surface 72 and annular groove 68 for seal 70 and the vertical distance between sealing surface 78 and annular groove 76 for seal 74 operably aiding the sealing of the conduit chamber 16.

The offset of primary seals 70 and 76 provides a resultant axial force component of such magnitude to create a uni-directional axial force on the swivel S operably aiding continuously in the sealing of the conduit chamber 16. In other words, the uni-directional downward force on the outer ring 50 with respect to inner ring 24 of the preferred embodiment is of a magnitude such that when upward external forces act on the swivel, the resultant axial force is uni-directionally downwardly.

The swivel S further comprises a secondary upper face seal 80 disposed above the conduit chamber 16 in vertical alignment with the primary upper face seal 70 in a third annular groove 82 of upper sealing portion 32 of the inner ring 22 for sealingly engaging a sealing surface 84 on the second upper sealing portion 58 of the rotatable outer ring 48. The secondary upper seal 80 is in communication with the primary upper seal 70 by the gap defined by the substantially outwardly facing surface 46 of the inner ring 22 and the substantially inwardly facing surface 66 of the outer ring 48.

Also a secondary lower face seal 86 is disposed below the conduit chamber 16 in vertical alignment with the primary lower face seal 74 in a fourth annular groove 88 in the lower sealing portion 52 of the outer ring 48 for sealingly engaging a sealing surface 90 of the second lower sealing portion 28 of the inner ring 22. The secondary lower face seal 86 is in communication with the primary lower face seal 74 through the gap defined by the substantially outwardly facing surface 46 of the inner ring 22 and the substantially inwardly facing surface 66 of the outer ring 48.

If the primary upper seal 70 fails to retain pressure in the conduit chamber 16, the secondary upper seal 80 maintains the pressure which results in the thrust or axial loading of the inner and outer rings, as if the primary seal 70 were still in sealing engagement. This is achieved by the vertical alignment of the secondary upper seal 80 relative to the primary upper seal 70. Because the thrust loading has been maintained, the vertical distance between the surfaces 46 and 66 does not change, therefore providing another advantageous feature of the invention. Similarly upon a failure of the primary lower seal 74, the vertically aligned secondary lower seal 86 maintains the axial loading of the swivel S thereby maintaining the vertical distance between the surfaces 46 and 66.

Figure 4:
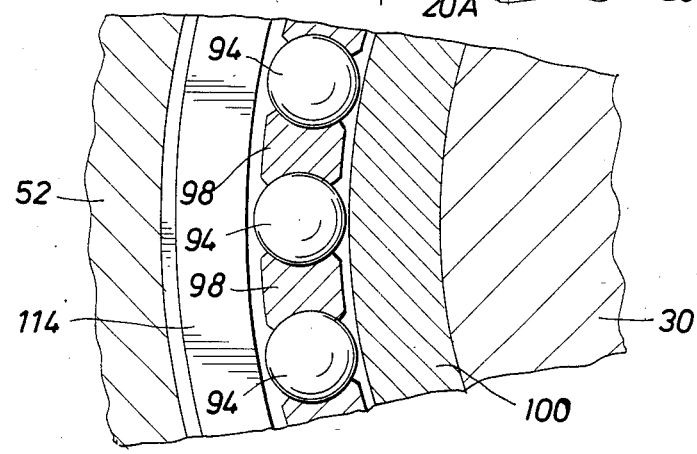
FIG. 4, which shows a section through lines 4—4 of FIG. 3, illustrates a raceway chamber of a bearing assembly being loaded with bearing balls and spacers.

A ball bearing assembly generally designated as 92, is disposed between the inner ring 22 and the outer ring 48 and having a plurality of identical bearing balls 94. As shown in FIGS. 3 and 4, the assembly 92 rotatingly supports the inner ring 22 axially and radially with respect to the outer ring 48. FIGS. 3 and 4 illustrate the plurality of bearing balls 94 in a toroidally shaped raceway chamber 97 with bearing balls preferably spaced from one another by means of spacers 98.

The bearing assembly 92 further comprises a first annular bearing race element 100 secured to the inner ring 22 between the second lower sealing portion 28 and the bottom flange portion 30. The bearing race element 100 has an outwardly facing concave bearing surface 96 and two outwardly facing annular contacts 102 and 106.

A second annular bearing race element 108 is positioned adjacent the lower sealing portion 52 of the outer ring 48. A third annular bearing race element 114 is positioned below the second annular bearing race element 108 and adjacent the lower sealing portion 52 of the outer ring 48. The second race element 108 and the third race element 114 may be formed of one integral race element similar to element 100. The second element 108 and the third element 114 present an inwardly facing concave bearing surface 110. The surface 110 of element 114 has an annular inwardly facing contact 116 thereon and the surface 110 of the second element 108 has an annular inwardly facing contact 112 thereon. The second element 108 and the third element 114 are secured below and adjacent lower sealing portion 52 by bolt 118 threadedly received in a threaded bore in portion 52.

When the outer ring 48 and inner ring 22 are assembled together with the first element 100, the second element 108 and the third element 114 assembled therebetween, the bearing surfaces 110 and 96 form a toroidally shaped raceway chamber 97, as discussed above, having four contacts 102, 106, 112 and 116 thereon. The four point contact ball bearing assembly 92 aids in transferring the uni-directional axial loading created upon pressurization of the conduit chamber 16 in cooperation with the offset of the primary seal means 70 and 74 while tolerating radial forces and deflections. The radial deflections include deflections resulting from the pressurization of the conduit chamber 16.

The thrust or axial loading of the swivel S urges the rotatable outer ring 48 toward the stationary inner ring 22 for uni-directional loading on the bearing balls 94 to assure concentricity of the bearing balls 94 between the bearing race elements 100, 108, and 114 and therefore, between the inner ring 22 and the outer ring 48. Additionally, the axial loading provides wear compensation for the bearing assembly means 92. The axial loading created by the offset of the seals is of such a magnitude that the force resisted by the bearing balls 94 is uni-directional, therefore producing more favorable loading for the bearing assembly 92. In other words, the rotatable outer ring 48, of the preferred embodiment, will exert a downward load on the elements 108 and 114 and in turn on balls 94. Such downward load is greater than expected external upward loads of the ring 48 with respect to outer ring 22. Element 100 and inner ring 22 are stationary in the preferred embodiment. The bearing balls 94 provide an equal and opposite uni-directional force in reaction to the downward force or load of the rotatable outer ring 48. This upwardly directed force of the bearing balls is uni-directional in that it is in reaction to the sum of downward forces of ring 48 with respect to ring 22 due to pressurization and possible external upward forces on ring 48 with respect to ring 22.

A leak detection channel 120 is provided extending laterally through the first upper sealing portion 56 of the outer ring 48 to an opening between the primary upper seal 70 and the secondary upper seal 80. Likewise, a leak detection channel 122 is provided in the primary outer ring 50 and extends to an opening between the primary lower seal 74 and the secondary lower seal 86. A leak detection valve 124 is connected to the leak detection channel 120. Similarly, leak detection valve 126 is connected to leak detection channel 122. The leak detection channel 120 in cooperation with leak detection valve 124 provides a means to determine externally from the swivel S whether or not leakage is occurring past the primary upper seal 70. Likewise, leak detection channel 122 in cooperation with leak detection valve 126 provides a means to determine if pressurized fluid is leaking past primary lower seal 74. It is to be understood that in the preferred embodiment face or lip seals are used for seals 70, 74, 80, and 86 but that other types of seals may be used advantageously in this invention.

Each swivel section (except the lower most section as illustrated in FIG. 2) further includes two downwardly facing annular grooves 128 and 130 in the bottom flange portion 54 of the outer ring 48. Flange 54 is secured to lower sealing portion 52 by means of bolt 64. Excluder seals 132 and 134 sealingly engage an upwardly facing surface 136 of the swivel section adjacent below (see FIG. 3). Excluder seals 132 and 134 prevent debris and dirt from entering the toroidally shaped bearing raceway chamber. Excluder seal 132 also serves as a grease retainer maintaining lubrication within the ball bearing raceway chamber 96. FIG. 2 also illustrates the lower most swivel section has an "L" shaped bottom flange portion 54' which has two excluder seals for sealingly engaging a downwardly facing surface of the bottom flange portion 30'. Closing ring 13 bolted to the topmost swivel section has two seals 55 for sealing the top outer rotatable ring with respect to the top inner stationary ring.

FIG. 5 shows an alternative embodiment of a swivel assembly S' from that of FIGS. 2 and 3, where an outer ring 48' is fixed to a stationary pedestal 42' while the inner ring 22' is rotatable. When the outer ring 48' is assembled with the inner ring 22' a toroidally shaped conduit chamber 16' is defined. A toroidal bearing raceway chamber 96', in which bearing balls 94' are disposed for axially and radially supporting the outer and inner rings with respect to one another. The chamber 96' is formed by elements 108', 100' and 114'. In similar fashion to that illustrated in FIG. 3, primary upper seal 70' sealingly engages stationary outer ring 48' rotatable inner with rotatable inner ring 22' and primary lower seal 74' sealingly engages the inner ring 22' with the outer ring 48' providing sealing of conduit chamber 16'.

Seconary upper seal 84' vertically aligned above and in communication with primary upper seal 70' and secondary lower seal 86' vertically aligned below and in communication with the primary lower seal 74' are positioned so that upon failure of the respective primary seal, the respective secondary seal will maintain the axial loading initially created by the radial offset of primary upper seal 70' with primary lower seal 74'.

In the alternative embodiment, inner ring 22' provides a thrust load downwardly to decrease the vertical distance between the sealing surfaces operably aiding in the sealing of the conduit 16'. Simultaneously, the downward movement of the inner ring 22' provides a uni-directional thrust load on the bearing assembly means 92' upon pressurization of the conduit chamber 16' to assure concentricity of the bearing balls 94' between the inner ring 22' and the outer ring 48' and to provide wear compensation for the bearing assembly means 92'. Outer ring 48' may be connected to outer rings stacked above and below it by means of threaded bores and bolts.

Various modifications and alterations in the described structures will be apparent to those skilled in the art of the foregoing description which does not depart from the spirit of the invention. For this reason, these changes are desired to be included in the appended claims. The appended claims recite only the limitation of the present invention in the descriptive manner which is employed for setting forth the embodiments and is to be interpreted as illustrative and not limitative.

What is claimed is:

1. A product swivel adapted for rotating about a substantially vertical axis, comprising:
    a swivel body having,
        an inner ring having a substantially outwardly facing surface;
        an outer ring having a substantially inwardly facing surface;
        said surfaces, when said inner ring is in registration with said outer ring, forming a toroidally shaped conduit chamber;
        one ring being stationary and the other ring rotatable about the stationary ring;
    means for rotatingly supporting one ring with respect to the other ring;
    said swivel body having an inlet and an outlet communicating with said conduit chamber by which fluid product is conducted under pressure;
    a primary upper seal means disposed above the conduit chamber in a first annular groove in one ring for sealingly engaging a sealing surface of the other ring, said primary upper seal means being subject to the pressure within said conduit chamber;
    a primary lower seal means disposed below the conduit chamber in a second annular groove in one ring for sealingly engaging a sealing surface of the other ring, said primary lower seal means being subject to the pressure within said conduit chamber;
    one primary seal means being offset a greater distance from the vertical axis of the swivel than the other primary seal means;
    whereby pressurization of the conduit chamber in cooperation with the offset of the primary seal means creates axial loading of said rings to urge the rotatable ring toward the stationary ring for decreasing vertical distance between the sealing surfaces operably aiding in the sealing of the conduit chamber.

2. The swivel of claim 1 wherein said inner ring is stationary and said outer ring is rotatable about said inner ring.

3. The swivel of claim 1 wherein said supporting means comprises
a four point contact ball bearing assembly positioned between a stationary inner ring and a rotatable outer ring, said ball bearing assembly including a plurality of bearing balls.

4. The swivel of claim 1 further comprising
a secondary upper seal means disposed above the conduit chamber in vertical alignment with said primary upper seals means in a third annular groove in one ring for sealingly engaging a sealing surface of the other ring, said secondary upper seal means being in communication with said primary upper seal means;
a secondary lower seal means disposed below the conduit chamber in vertical alignment with said primary lower seal means in a fourth annular groove in one ring for sealingly engaging a sealing surface of the other ring, said secondary lower seal means being in communication with said primary lower seal means;
whereby if said primary upper or lower seal means were to fail to retain pressure in the conduit chamber, said respective secondary seal means would maintain the axial loading of the inner and outer rings thereby maintaining the tendency to decrease the vertical distance between the sealing surfaces.

5. The swivel of claim 4 wherein said primary and secondary seal means are face seals.

6. The swivel of claim 4 wherein said first and third annular grooves are disposed in a stationary inner ring, and said second and fourth annular grooves are disposed in a rotatable outer ring.

7. A swivel adapted for rotating about a substantially vertical oriented axis, comprising:
a swivel body having,
an inner ring having a substantially outwardly facing surface;
an outer ring having a substantially inwardly facing surface;
said surfaces, when said inner ring is in registration with said outer ring, forming a toroidally shaped conduit chamber;
one ring being stationary and the other ring rotatable about the stationary ring;
a ball bearing assembly positioned between said inner ring and said outer ring having a plurality of bearing balls for rotatingly supporting one ring with respect to the other ring;
said swivel body having an inlet and an outlet communicating with said conduit chamber by which fluid product is conducted under pressure;
a primary upper seal means disposed above the conduit chamber in a first annular groove in one ring for sealingly engaging a sealing surface of the other ring, said primary upper seal means being subject to the pressure within said conduit chamber;
a primary lower seal means disposed below the conduit chamber in a second annular groove in one ring for sealingly engaging a sealing surface of the other ring, said primary lower seal means being subject to the pressure within said conduit chamber;
one primary seal means being offset a greater distance from the vertical axis of the swivel than the other primary seal means;
whereby pressurization of the conduit chamber in cooperation with the offset of the primary seal means creates axial loading of said rings to urge the rotatable ring toward the stationary ring for uni-directional loading on the bearing balls to assure concentricity of the bearing balls between the inner ring and outer ring and to provide wear compensation for the bearing assembly means.

8. The swivel of claim 7 wherein said inner ring is stationary and said outer ring is rotatable about said inner ring.

9. The swivel of claim 7 wherein said ball bearing assembly comprises a four point contact ball bearing assembly positioned between the inner ring and the outer ring.

10. The swivel of claim 7 further comprising
a secondary upper seal means disposed above the conduit chamber in vertical alignment with said primary upper seals means in a third annular groove in one ring for sealingly engaging a sealing surface of the other ring, said secondary upper seal means being in communication with primary upper seal means;
a secondary lower seal means disposed below the conduit chamber in vertical alignment with said primary lower seal means in a fourth annular groove in one ring for sealingly engaging a sealing surface of the other ring, said secondary lower seal means being in communication with said primary lower seal means;
whereby if said primary upper or lower seal means fail to retain pressure in the conduit chamber said respectively secondary seal means would maintain the axial loading of the inner and outer rings.

11. The swivel of claim 10 wherein said primary and secondary seal means are face seals.

12. The swivel of claim 10 wherein said first and third annular grooves are disposed in a stationary inner ring, and said second and fourth annular grooves are disposed in a rotatable outer ring.

13. The swivel of claim 7 wherein said bearing assembly further comprises
a first annular bearing race element secured to said inner ring having an outwardly facing concave bearing surface, said bearing surface having two annular outwardly facing annular contacts thereon,
a second annular bearing race element secured to said outer ring having an inwardly facing concave bearing surface, said bearing surface having an annular inwardly facing contact thereon,
a third annular bearing race element secured to said outer ring, said third bearing race element presenting an inwardly facing concave bearing surface, said third bearing surface having an annular inwardly facing contact thereon,
a plurality of bearing balls disposed in said bearing chamber rotatingly supporting one ring with respect to the other ring, whereby
when said outer and inner rings are assembled with said first, second and third elements, said bearing surfaces form a toroidally shaped bearing chamber having four contacts, and
said four point contact ball bearing assembly operably maintains uni-directional axial loading under conditions of external axial loading while simultaneously while tolerating radial deflections that occur as a result of the pressurization of the conduit chamber.

* * * * *